C. C. BOLEN.
HAND BRAKE FOR RAILWAY CARS.
APPLICATION FILED AUG. 15, 1912. RENEWED NOV. 6, 1913.

1,084,247.

Patented Jan. 13, 1914.

Inventor
Charley C. Bolen.

Witnesses

By Shepherd & Campbell
Attorneys

UNITED STATES PATENT OFFICE.

CHARLEY C. BOLEN, OF MARION, OHIO, ASSIGNOR OF TWO-THIRDS TO WILLIAM W. SANDERS, HECTOR S. YOUNG, BENJAMIN JACOBY, AND CHARLES L. JUSTICE, ALL OF MARION, OHIO.

HAND-BRAKE FOR RAILWAY-CARS.

1,084,247.   Specification of Letters Patent.   Patented Jan. 13, 1914.

Application filed August 15, 1912, Serial No. 715,248. Renewed November 6, 1913. Serial No. 799,627.

*To all whom it may concern:*

Be it known that I, CHARLEY C. BOLEN, a citizen of the United States of America, residing at Marion, in the county of Marion and State of Ohio, have invented certain new and useful Improvements in Hand-Brakes for Railway-Cars, of which the following is a specification.

This invention relates to a hand brake for railway cars.

The object of the invention is to provide an improved device of this character primarily intended for use upon freight cars, though it is equally as well adapted for use upon passenger or street cars.

The present invention aims to provide a brake that will be entirely safe, that is, a brake which may be released without danger of the brakeman being thrown from the top of the car by the sudden release of the parts.

It further aims to provide a brake that will be very powerful in action, simple and inexpensive in construction, one not likely to get out of order and one in which snow and ice will not interfere with its proper operation.

Further objects and advantages of the invention will be set forth in the detailed description which now follows.

Figure 1:
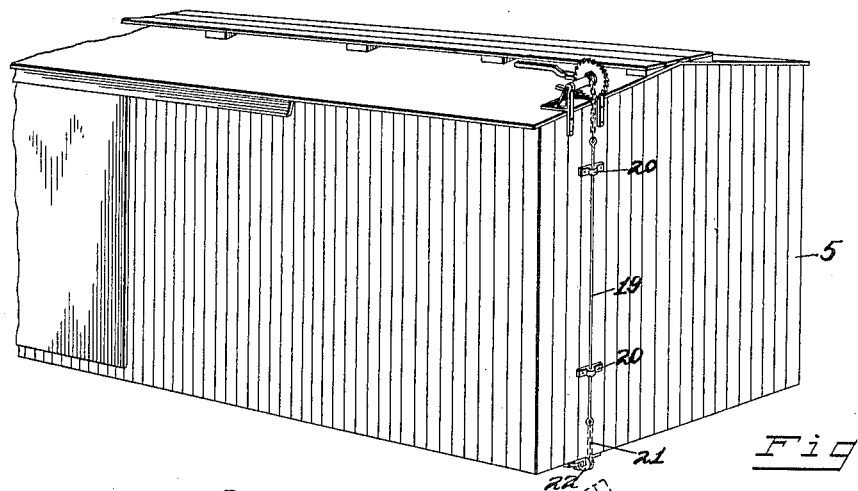
Figure 5:
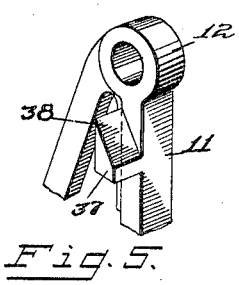
Figures 2, 3, 4:
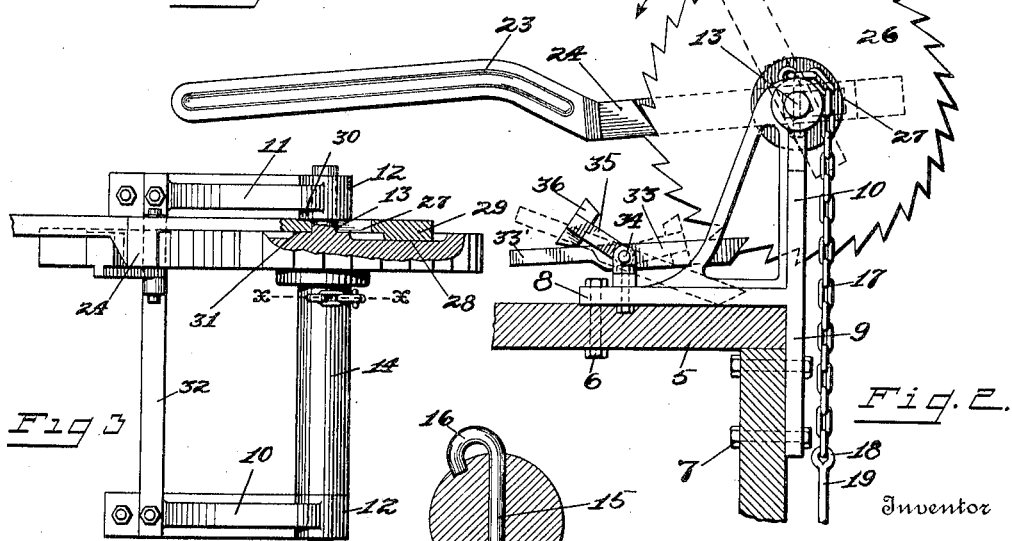

In the accompanying drawing, Figure 1 is a perspective view of a box car having the invention applied thereto. Fig. 2 is a side elevation of the braking mechanism. Fig. 3 is a plan view thereof. Fig. 4 is a transverse section through the winding drum upon line X—X of Fig. 3, and Fig. 5 is a detailed perspective view of a portion of one of the bearing brackets hereinafter described.

Like numerals designate corresponding parts in all of the figures of the drawing.

Referring to the drawing, the numeral 5 designates a box car. Bolts 6 and 7 pass through the horizontal and vertical legs 8 and 9 of bearing brackets 10 and 11. Journaled in bearings 12 of said brackets are the reduced portions 13 of a winding drum 14. A bolt 15 having a hooked end 16 passes through the drum 14 and is engaged with one end of a chain 17. The opposite end of this chain is engaged with an eyelet 18 of a rod 19. This rod 19 is slidable through keepers 20 and at its opposite end is secured to the chain 21, which passes over a pulley 22, said chain operating in the usual manner the brake beams and shoes (not shown). A hand lever 23 is provided with a pawl tooth 24 to adapt it for engagement with any one of the teeth 25 of a ratchet wheel 26, this ratchet wheel being integral with drum 14. The lever 23 is slotted at 27 and through this slotted portion, one of the reduced portions 13 passes. The ratchet wheel 26 is provided with a flat outer face 28 and engages a head 29 having a flat inner face formed upon the lever 23, the flat face of head 29 bearing upon the face 28 of the ratchet wheel. Lever 23 has a further bearing between the inner face of bearing 12 at 30, and the outer face 31 of a hub-like portion of ratchet wheel 26, the bearings on these surfaces in conjunction with the bearings of the flat face 29 upon the flat face 28 of the ratchet wheel effectually holding the lever 23 in its place and preventing any undue wabbling thereof. A cross bar 32 extends between and is bolted to the horizontal legs 8, and upon this cross bar is pivoted a pawl 33. A pin 34 passes through this pawl and through lever 35 upon the outer end of which is mounted a weight 36. Mounted upon the inner face of the bearing bracket 11 is a stop lug 37 having an inclined face 38 lying at the proper angle to engage the underside of the outer end of lever 23 when the lever is moved to the dotted line position shown in Fig. 2.

The operation of the device is as follows: The brakeman grasps lever 23 and pulls upon the same to bring the pawl tooth 24 out of engagement with the ratchet teeth 25. He then swings the handle to the position illustrated in dotted lines in Fig. 2, at which time the weight of the handle will cause the pawl tooth to move into engagement with the ratchet teeth. The handle or lever 23 is then swung downwardly in the direction of the arrow (Fig. 2), and rotation is imparted to the drum 14 to wind the chain thereon and to set the brakes, as will be readily understood. To prevent retrograde movement of the ratchet wheel and drum, the weight 36 is thrown to the full line position shown in Fig. 2, at which time it bears upon the tail end 33' of pawl 33, this pawl serving to hold the ratchet wheel against reverse movement. After the brake has been set and it is desired to release the same, the weight 36 is thrown to the position illustrated in dotted lines in Fig. 2, and the operator grasps the handle or lever 23 and forces the same downwardly a slight distance. This moves the engaging tooth of the ratchet wheel out of engagement with the pawl, and permits said pawl to drop under the influence of the weight. By then giving the lever 23 a sharp pull toward him, the operator may suddenly and completely release the brake. The stop lug 37 serves the double function of preventing the lever 23 from falling over between the cars or from moving far enough to jerk the brakeman from the end of the car if he should lose control of the same. The tail 33' not only forms a point for the weight 36 to bear upon, but by throwing the weight to the position illustrated in dotted lines and placing his foot upon the tail 33', the brakeman may work this lever back and forth to dislodge any snow or ice therefrom.

While the elements shown and described are well adapted to serve the purposes for which they are intended, it is to be understood that the invention is not limited to the precise construction set forth, but includes within its purview, such changes as may be made within the scope of the appended claim.

Having described my invention, what I claim is:—

In a device of the character described, the combination with a support, of a drum journaled therein, a brake element adapted to be wound upon said drum, a ratchet wheel carried by said drum, a slotted lever through which a reduced portion of said drum passes, a pawl tooth carried by said lever and adapted to be moved into engagement with or disengaged from the teeth of the ratchet wheel by a longitudinal shifting thereof, said lever having a bearing against said support, a plain portion of said ratchet wheel adjacent the point at which the reduced portion of the drum passes therethrough, said ratchet wheel having a flat outer side face and a terminal head formed upon said lever, said head having a flat inner side face which has a bearing upon the flat outer side face of the ratchet wheel.

In testimony whereof I affix my signature in presence of two witnesses.

CHARLEY C. BOLEN.

Witnesses:
L. CARL STOUGHTON,
HATTIE B. GOMPF.